United States Patent [19]
Miyazaki et al.

[11] Patent Number: 5,835,157
[45] Date of Patent: Nov. 10, 1998

[54] MULTI-SYSTEM VIDEO SIGNAL DEMODULATING APPARATUS

[75] Inventors: Shinichirou Miyazaki; Masayuki Miyagawa; Akira Shirahama, all of Kanagawa, Japan

[73] Assignee: Sony Corporation, Tokyo, Japan

[21] Appl. No.: 494,774

[22] Filed: Jun. 26, 1995

[30] Foreign Application Priority Data

Jun. 30, 1994 [JP] Japan .................................. 6-170321

[51] Int. Cl.$^6$ .................................................. H04N 5/46
[52] U.S. Cl. .......................... 348/558; 348/555; 348/556
[58] Field of Search .................................. 348/555, 557, 348/558, 726, 524; H04N 5/46

[56] References Cited

U.S. PATENT DOCUMENTS

| | | | |
|---|---|---|---|
| 4,561,021 | 12/1985 | Abe | 348/558 |
| 4,600,937 | 7/1986 | Kudo | 358/21 |
| 4,639,765 | 1/1987 | D'Hont | 358/19 |
| 4,661,844 | 4/1987 | Rufray | 358/23 |
| 4,688,082 | 8/1987 | Kato | 258/21 |
| 5,119,177 | 6/1992 | Lim | 258/21 |
| 5,184,091 | 2/1993 | Srivastava | 331/10 |
| 5,374,962 | 12/1994 | Klink | 348/557 |
| 5,450,129 | 9/1995 | Matoba | 348/594 |

Primary Examiner—Mark R. Powell
Assistant Examiner—Vivek Srivastava
Attorney, Agent, or Firm—Jay H. Maioli

[57] ABSTRACT

A multi-system video signal demodulating apparatus includes at least a color signal processing unit and a color discriminating function for demodulating a component video signal from video signals of two or more different systems. The multi-system video signal demodulating apparatus includes a detector for detecting continuity between vertical synchronizing signals of the input video signals. The color discriminating function is executed when the detector detects a discontinuity between the vertical synchronizing signals. The continuity between the vertical synchronizing signals of the input video signals is detected. The color discriminating function is executed when a discontinuity between the vertical synchronizing signals is detected during continuity detection. A synchronizing signal of an input video signal is discriminated. A frequency of a color burst signal is discriminated based on a result of the synchronizing signal discrimination. The color burst discrimination is executed or stopped based on a result of the color burst discrimination. An amplitude of the color burst is discriminated based on a result of the synchronizing signal discrimination. A phase of the color burst is discriminated based on a result of the amplitude detection. A television system of the video signal is discriminated based on a result of the phase detection. An oscillation frequency of the crystal oscillator is discriminated based on a discriminated result of the television system discrimination.

7 Claims, 3 Drawing Sheets

MULTI-SYSTEM VIDEO SIGNAL DEMODULATING APPARATUS

BACKGROUND OF THE INVENTION

The present invention relates to an apparatus for automatically discriminating and demodulating signals of different television systems to supply a demodulated video signal to a cathode ray tube for monitoring a picture, or an apparatus for recording and reproducing a demodulated signal.

NTSC system, PAL system and SECAM system are very popular in the world as representing present standard television broadcasting systems. Television receivers and recording and reproducing apparatus (VCR) have receiving units and demodulating units corresponding to the above-mentioned television broadcasting systems.

Certain places, such as some of the European countries can receive the broadcast waves of two broadcast systems. In the above areas, it is frequently observed that a viewer uses a television receiver called a multi-system standard television receiver that is available to automatically discriminate a broadcasting system of the received broadcast wave and demodulate a video signal of the discriminated broadcasting system.

FIG. 1 is a block diagram showing an example of the multi-system television receiver.

As shown in FIG. 1, a reception unit 1 thereof includes a tuner, an RF amplifier and a detecting unit. The reception unit 1 selects a broadcast channel of a broadcast wave received by an antenna 10, amplifies a received signal such that the selected signal is held at a predetermined level, and detects the signal. A switch 2 selects a detected video signal (a composite signal) or video signals S1, S2 supplied from an external device (not shown). An A/D (analog-to-digital) converter 3 converts the selected video signal into a digital signal.

A video processor (VP) 4 includes a Y/C separating circuit 4a for separating the digital video signal, which was converted by the A/D converter 3, into a luminance signal Y and a chrominance signal C, and a chrominance signal decoder 4b for processing a color video signal in accordance with a television system of the received broadcast wave. The video processor 4 outputs component video signals (R, G, B) or (Y, R-Y, B-Y) and is formed of one digital integrated circuit.

The video processor 4 for thus processing the video signal incorporates the decoder 4b which receives a control signal supplied through an I²C bus system and outputs the above video component signals derived from an NTSC composite signal or a PAL composite signal.

In the arrangement shown in FIG. 1, a SECAM television signal is input to the video processor 4 through a SECAM decoder 11 for demodulating a received analog television signal. The video processor 4 processes the signal demodulated by the SECAM decoder 11 in accordance with a signal output from a SECAM killer discriminating circuit 12 for detecting a SECAM signal.

A system microcomputer 6 has a function to discriminate the television system of the received broadcast wave based on the video signal input to the video processor 4 and synchronization information output from a synchronization and deflection processor 5. The system microcomputer 6 is connected to a nonvolatile memory (RAM) 7. The system microprocessor 6 selects information stored in the memory 7 in accordance with a discriminated result of the television system of the received broadcast wave. Based on the selected information, the system microprocessor 6 carries out various controls such as selecting a broadcast channel of the reception unit 1, switching a clock for setting a sampling frequency of digital data input to the video processor 4, adjusting a picture quality, and controlling a signal generator 8 for supplying signals to a deflection system 20. The synchronization and deflection processor 5 has a color function to switch crystal oscillators for the NTSC and PAL systems at every one period of a horizontal synchronizing pulse in order to discriminate whether a field frequency is 50 or 60 Hz and whether or not the signal is detected.

According to such multi-system television receiver, when a broadcast signal is received by the antenna 10 and input through an antenna terminal to the reception unit 1 in an electronic channel selection operation, the reception unit 1 supplies the received signal of the selected channel to the A/D converter 3 as a composite signal and the A/D converter 3 converts the received analog composite signal into the digital composite signal and inputs the converted digital signal to the video processor 4. When the synchronization and deflection processor 5 detects a deflection frequency of the received signal and a color subcarrier frequency thereof, the system microcomputer 6 discriminates the television system of the received signal based on the detected information from the synchronization and deflection processor 5. Based on the discriminated result, the system microprocessor 6 supplies a control command signal to the video processor 4 through an I²C data bus and the video processor 4 carries out a color signal processing corresponding to the television system of the signal.

The case of such multi-system television receiver, whenever the channel of the received broadcast wave is switched, the synchronization and deflection processor 5 detects a color subcarrier frequency of a signal of the selected broadcast channel and a period of the vertical scanning signal and the system microcomputer 6 supplies the control command signal to the video processor 4 through the I²C data bus such that the video processor 4 carries out the desired video signal processing.

Recently, in addition to the above-mentioned three television systems, i.e., the NTSC system, the PAL system, and the SECAM system, the video signals of two other color television systems shown on the following Table 1 are used in European countries; a video signal of an NTSC 4.43 system with a color subcarrier frequency of 4.43 MHz and a field frequency of 60 Hz and a video signal of a PAL 60 system with a subcarrier frequency of 4.43 MHz and a field frequency of 60 Hz.

TABLE 1

| color television system | field frequency | clock frequency (4fsc) | color subcarrier frequency (fsc) |
|---|---|---|---|
| NTSC 3.58 | 60 Hz | 14.31818 MHz | 3.579545 MHz |
| PAL | 50 Hz | 17.734475 MHz | 4.43361875 MHz |
| SECAM | 50 Hz | 17.734475 MHz | 4.43361875 MHz |
| NTSC 4.43 | 60 Hz | 17.734475 MHz | 4.43361875 MHz |
| PAL 60 | 60 Hz | 17.734475 MHz | 4.43361875 MHz |

When all the above five color television systems are discriminated by an existing discrimination method, the discrimination method encounters the following problems.

When a video signal of the NTSC 3.58 system with a field frequency of 60 Hz is received, a crystal oscillator is switched so that a clock frequency for signal processing in the video processor 4 has a frequency of 4 fsc which is four times higher than 3.58 MHz, i.e., the color subcarrier frequency of the NTSC system.

In the above-mentioned color discrimination method, when the broadcast channel is switched, when a power switch is turned on, and when a video signal with a field frequency of 50 Hz is detected after no signal has been detected, the crystal oscillator is reset each time and the color discriminating operation is started again. However, since the television system using the video signal with a field frequency of 60 Hz is limited to the NTSC 3.58 system according to the above-mentioned color discrimination method, the color discriminating operation is not carried out when the video signal with a field frequency of 60 Hz is detected after no signal has been detected. When a monochrome video signal is received, it is general practice to set the signal processing mode to a mode of processing a signal of the NTSC 3.58 system.

Accordingly, when a video signal with a field frequency of 60 Hz input from the outside is switched, e.g., when a video signal supplied from a VCR is switched to a video signal received by the VCR, if both of the video signals are video signals of different systems with field frequencies of 60 Hz, e.g., if one is a video signal of the NTSC 3.58 system and the other is a video signal of the NTSC 4.33 system or the PAL 60 system, there is then the problem that the same signal processing is carried out even when the video signal is switched to another video signal with the same field frequency and a monochrome picture is displayed on a screen.

SUMMARY OF THE INVENTION

In view of such aspects, it is an object of the present invention to provide a multi-system video signal demodulating apparatus in which, when a television system of a television signal input thereto from an external device is switched to another broadcasting system by the external device, it is detected that synchronization information of a vertical synchronizing signal is changed in accordance with the switching, and a color discriminating operation is carried out at this time.

According to a first aspect of the present invention, the multi-system video signal demodulating apparatus includes at least a color signal processing unit and a color discriminating function for demodulating a composite video signal from video signals of two or more different systems. The multi-system video signal demodulating apparatus includes a detecting means for detecting continuity between vertical synchronizing signals of the input video signals. The color discriminating function is executed when the detecting means detects discontinuity between the vertical synchronizing signals.

According to a second aspect of the present invention, the continuity between the vertical synchronizing signals of the input video signals is detected. The color discriminating function is executed when discontinuity between the vertical synchronizing signals is detected during the continuity detection. A synchronizing signal of an input video signal is discriminated. A frequency of a color burst signal is discriminated based on a result of the synchronizing signal discrimination. The color burst discrimination is executed or stopped based on a result of the color burst discrimination. An amplitude of the color burst is discriminated based on a result of the synchronizing signal discrimination. A phase of the color burst is discriminated based on a result of the amplitude detection. A television system of the video signal is discriminated based on a result of the phase detection. An oscillation frequency of the crystal is discriminated based on a discriminated result of the television system discrimination.

According to the present invention, even if a channel is not changed and the apparatus is not energized or de-energized, a color discriminating operation is started in accordance with a detection output used for constantly monitoring a state of the vertical synchronizing signal when synchronization information of an input video signal is changed. Therefore, even if a clock frequency is set to a wrong clock frequency particularly in a state that a color burst signal is not detected, it is possible to start again an operation of detecting a color subcarrier wave of a newly input color signal and to constantly carry out a correct color signal processing.

Specifically, the multi-system video signal demodulating apparatus according to the present invention can execute the color discriminating operation again in accordance with a result of a non-standard signal discrimination used to detect change of the input video signal with a field frequency of 60 Hz. Therefore, it is possible to carry out a correct color signal processing even when automatic color discrimination cannot be carried out by a color discrimination system using a burst-locked type digital chrominance signal decoder, e.g., when a video signal of an NTSC 3.58 system is converted into a monochrome signal including a noise by operating a switch of an external device and then a video signal of an NTSC 4.43 system is input. Moreover, since the color discriminating operation is executed when a VTR is returned to its playback mode from its special playback mode such as a pause mode or picture searching mode, it is possible to constantly carry out the correct color discrimination operation.

DETAILED DESCRIPTION OF THE PREFERRED EMBODIMENT

Figure 1:
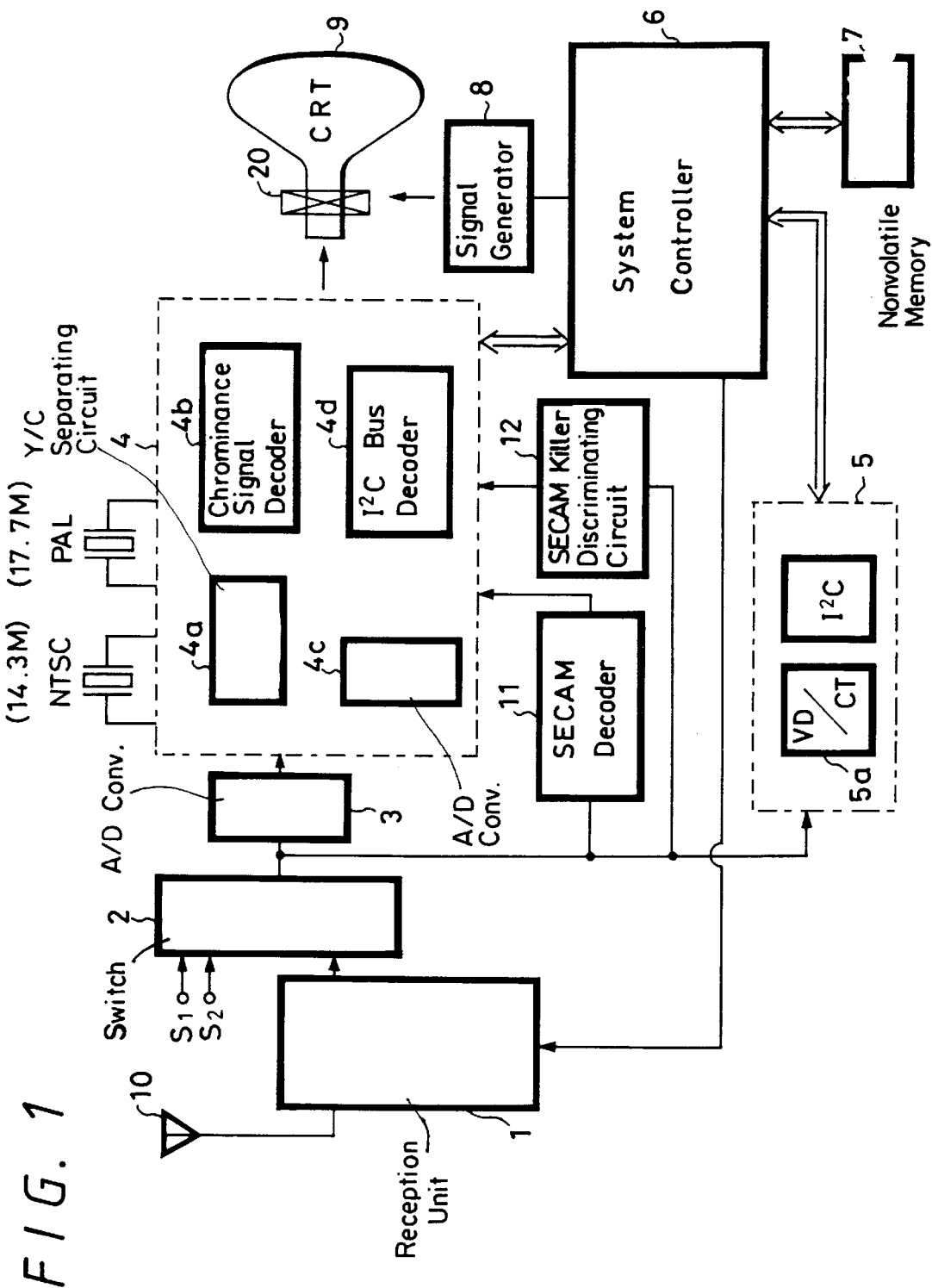
FIG. 1 is a block diagram showing a schematic arrangement of a color television receiver including a multi-system video signal demodulating circuit.

An embodiment of the present invention will be described with reference to FIG. 2 together with FIG. 1 which shows a schematic circuit arrangement of a multi-system video signal television receiver.

Figure 2:
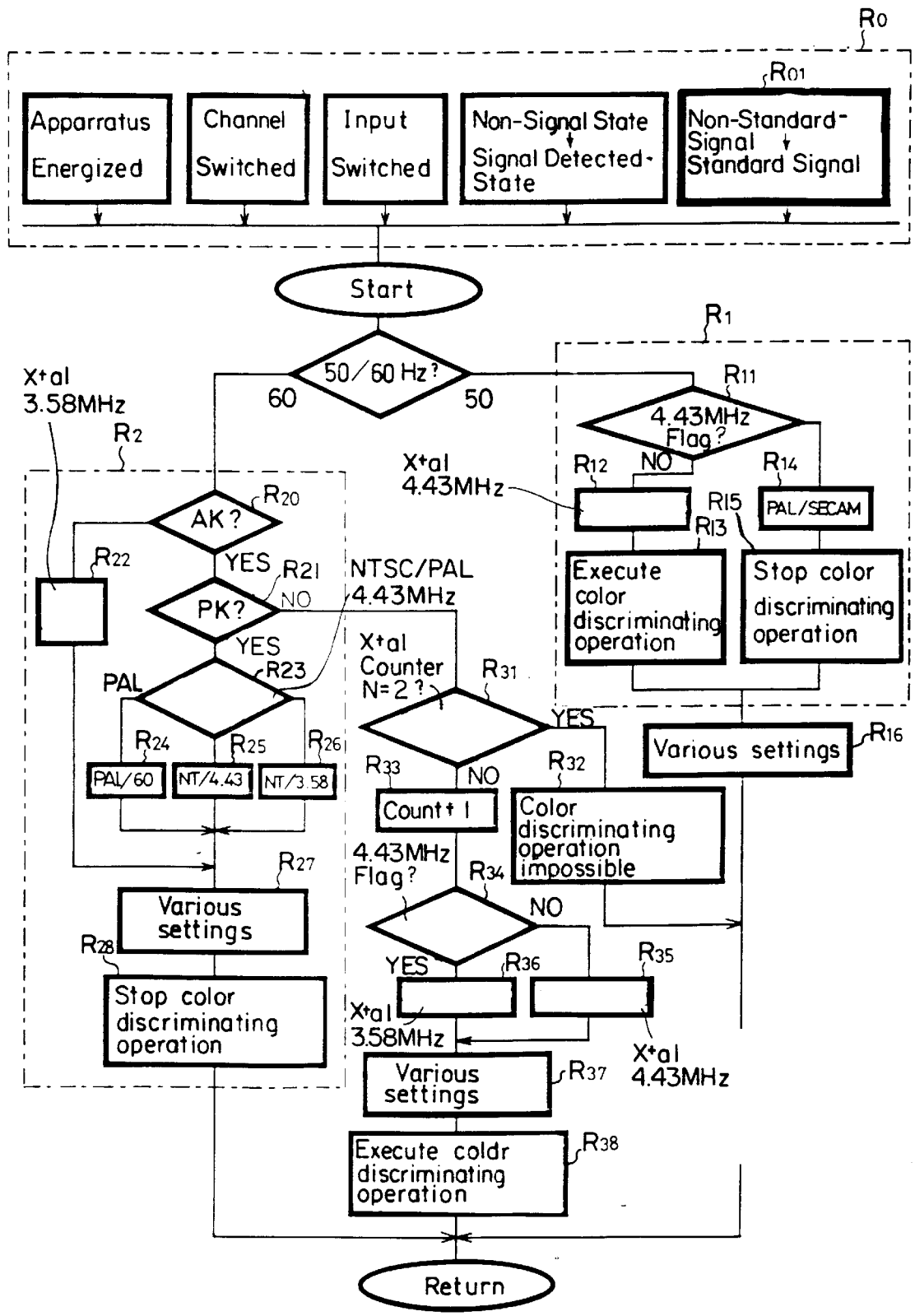
FIG. 2 is a flowchart showing an color discriminating operation according to the present invention; a FIG. 3 is a diagram used to explain a detection signal DP output when the input signal is switched from a non-standard signal.

FIG. 2 is a flowchart showing a color discrimination method of a microprocessor according to the present invention. Items of a condition R0 under which a multi-system video signal demodulating apparatus according to the present invention starts a color discriminating operation are shown by a dotted line in this flowchart. As shown in the items of the condition R0, the color discriminating operation is usually started when a television receiver is energized, when a broadcast channel is switched, when an input source is switched (by a switch 2), and when a broadcasting video signal with a field frequency of 50 Hz is detected after no signal has been detected. According to the present invention, an item R01 for starting the color discriminating operation when a non-standard synchronizing signal is changed to a standard synchronizing signal is included in the above-mentioned items R0.

Specifically, a synchronization and deflection processor 5 monitors synchronization information of a vertical synchronizing signal of a television signal input from a switch 2 and outputs a signal indicative of a state of the synchronization information to a system microcomputer 6. Based on the output signal, the system microcomputer 6 monitors synchronization information of a signal switched by an external device and begins to execute the color discriminating processing in accordance with the flowchart shown in FIG. 2 when the synchronization information is changed.

When the color discriminating processing is started, it is initially determined whether a period of the vertical synchronizing signal is 50 Hz or 60 Hz. If it is determined that the period is determined as 50 Hz, then the processing proceeds to a subroutine R1 where it is discriminated whether a television signal is a PAL television signal or a SECAM television signal. In the subroutine R1, it is initially discriminated in step R11 whether or not a frequency of a color burst signal is 4.43 MHz.

If it is determined in step R 11 that the frequency of the color burst signal is 4.43 MHz, then it is discriminated in step R14 that the television system of the video signal is the PAL system or the SECAM system. Then, the color discriminating operation is ended in step R15. If it is determined in step R11 that the frequency of the color burst signal is not 4.43 MHz, then a crystal oscillator of the video processor 4 is switched to one having an oscillation frequency of 4.43 MHz or its four-hold frequency 4fsc in step R12. In step R13, the processing is returned to a start position of the flowchart to carry out the color discriminating operation again. After it is discriminated in step R14 again that the television system of the video signal is the PAL system or the SECAM system, the system microcomputer 6 supplies a command signal to the video processor 4 in accordance with the discriminated result.

If it is determined that the period of the vertical synchronizing signal is 60 Hz, then the processing proceeds to a subroutine R2. In the subroutine R2, an amplitude level of the color burst signal is initially detected in step R20. This detection is AK (amplifier killer) detection in which the amplitude of the color burst signal is detected and which is used to stop the output of a color signal in accordance with a detected level of the amplitude. If the detected amplitude level is smaller than a predetermined value, then the television signal is regarded as a monochrome video signal and the crystal oscillator is switched to one having an oscillation frequency of 3.58 MHz in step R22. If the detected amplitude level exceeds the predetermined level, i.e., if the television signal has a signal at a position of the color burst signal, then the processing proceeds to step R21. In step R21, it is determined by detecting a phase of the color burst signal by an PK (phase killer) detection that the signal at the position of the color burst signal is a normal color burst signal. This detection is carried out by determining whether a clock and the color burst signal are phase-matched. As well known, the phase detection can be carried out by determining the phase of the color burst signal by sampling the color burst signal with its four-fold color subcarrier frequency 4fsc. If the signal is determined to be the normal color burst signal in step R21, then it is determined in step R23 whether the television system of the television signal is the NTSC system or the PAL system.

In step R23, if the television system is the NTSC system, then it is also determined whether a subcarrier frequency of the television signal is 4.43 MHz or 3.53 MHz. In accordance with a signal indicative of discriminated results, various settings are carried out (in step R24, R25 or R26). Then, the video processor 4 carries out various settings in step R 27. After the video processor 4 finishes the various settings, the color discriminating operation is ended in step R28.

If it cannot be determined in the PK detection in step R21 for discriminating the phase of the color burst signal that the signal at the position of the color burst signal is the color burst signal, then the processing proceeds to step R31, whereat the count number of a counter is checked. If it is determined in step R31 that the number of the counter is "0" or "1", then the number N of the counter is added with "1" in step R33 and it is discriminated in step R34 whether or not a flag of 4.43 MHz is raised. If it is determined in step R34 that the flag of 4.43 MHz is raised, then the crystal oscillator is switched to one having an oscillation frequency of 3.58 MHz in step R36. If it is determined in step R34 that the flag of 4.43 MHz is not raised, then the frequency of the crystal oscillator is not switched from one having an oscillation frequency of 4.43 MHz in step R35 and various settings are carried out in step R37.

In step R38, the processing is returned to the start position of the flowchart to carry out the color discriminating operation again. If the phase of the normal color burst signal is detected in step R21, then the processing proceeds to the succeeding steps to carry out the various settings in step R27. If the phase of the normal color burst signal is not detected in step R21, then the processing proceeds to step R31 where the number of the counter is set to "2". In this case, it is determined in step R32 that the color discriminating operation cannot be executed.

When the color discriminating operation cannot be executed, it can be assumed that a monochrome television signal is input to the television receiver and a noise is superposed on the position of the color burst signal. At this time, the crystal oscillator is switched to one having an oscillation frequency of 3.58 MHz or 4.43 MHz.

When the monochrome television signal is input, a color killer circuit is operated to stop color signal processings.

According to the present invention, the condition R01 that the color discriminating operation is started when the synchronizing signal of the television signal with a field frequency of 60 Hz is changed from the synchronizing signal of the non-standard signal to the synchronizing signal of the standard signal is included in the condition R0 under which the color discriminating operation is started.

Specifically, when the video signal with a field frequency of 60 Hz is input and the color killer circuit is operated, the crystal oscillator is not switched from the 3.58 MHz crystal oscillator. At this time, if a source input from an external device is switched by switching the channel or selecting the output on the side of the external device, e.g., if a video signal reproduced from a video tape is switched to a video signal of the NTSC 4.43 system on the side of the external device, then, in most of cases, a vertical synchronizing signal of a video signal of the NTSC 4.43 system is not detected at the same interval as the vertical synchronizing signal of the video signal, i.e., discontinuity between both of the vertical synchronizing signals occurs. The system microcomputer 6 monitors this discontinuity between the vertical synchronizing signals by checking a signal indicating this discontinuity between the vertical synchronizing signals output from the synchronization and deflection processor 5. When the system microcomputer 6 is supplied with the signal indicative of the discontinuity between the vertical synchronizing signals, the system microprocessor 6 begins to execute the color discriminating operation in accordance with the flowchart shown in FIG. 2.

Figure 3:
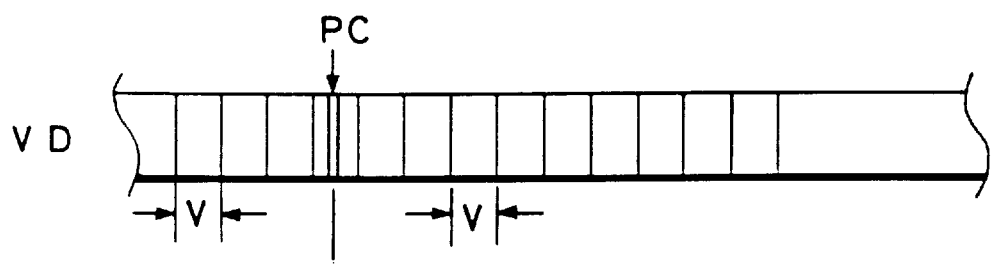
Figure 3A:
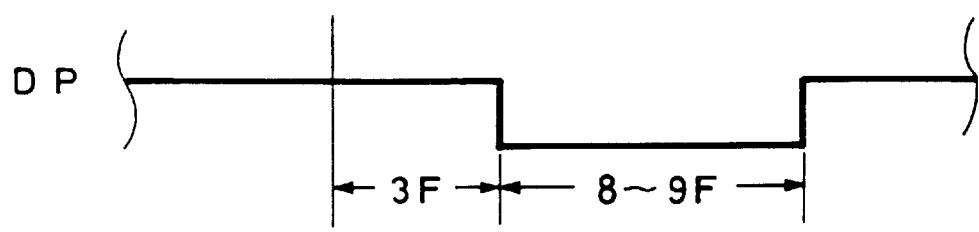

It is possible to detect the discontinuity between the vertical synchronizing signals by resetting a counter for counting a horizontal synchronizing signal (2fH) with the vertical synchronizing signal. Specifically, as shown in FIG. 3, an input video signal with a field frequency of 60 Hz is switched to another signal at a time PC, an output of the counter is fluctuated and a signal whose level is lowered for 8 to 9 fields after three fields is output in accordance with information indicative of the fluctuation.

Since a picture of one frame is formed of 525 scanning lines in the NTSC system, a count value of a down-counter which is preset at a value of "525" becomes "0" at every frame. However, as described above, when the standard video signal is switched to another signal by the external device, the count value of the down-counter is changed. However, when a non-standard signal mode is returned to a standard signal mode thereafter, the system microcomputer 6 begins to execute the color discriminating operation in accordance with the flowchart shown in FIG. 2. Thus, the correct reference subcarrier from the crystal oscillator is selected by selecting the crystal oscillator having a desired oscillation frequency to carry out the correct color signal processings.

Having described a preferred embodiment of the present invention with reference to the accompanying drawings, it is to be understood that the present invention is not limited to that precise embodiment and that various changes and modifications can be effected therein by one skilled in the art without departing from the spirit or scope of the invention as defined in the appended claims.

What is claimed is:

1. A multi-system video signal demodulating apparatus for demodulating an input composite video signal selected from video signals of at least two different signal systems, the apparatus comprising:

a color signal processing unit with a color discriminating function;

detecting means for detecting a continuity or discontinuity between vertical synchronizing signals of the input video signal, regardless of whether the video signals of the different signal systems have the same or a different field frequency; and means for controlling the color discriminating function when the detecting means detects a discontinuity between the vertical synchronizing signals, wherein the means for controlling includes means for discriminating whether an NTSC signal corresponds to an NTSC 4.43 signal or an NTSC 3.58 signal by discriminating a subcarrier frequency of the NTSC signal.

2. A multi-system video signal demodulating apparatus according to claim 1, wherein the detecting means comprises counting means which is reset by a vertical synchronizing signal and which counts a horizontal synchronizing signal.

3. A multi-system video signal demodulating apparatus according to claim 2, wherein the color signal processing unit includes a switchable clock means for processing a color signal by switching a clock frequency.

4. A multi-system video signal demodulating apparatus according to claim 3, wherein the video signals of the at least two different signal systems include NTSC 4.43, NTSC 3.58, PAL, and SECAM video signals.

5. A signal detecting method of a multi-system video signal demodulating apparatus having at least a color signal processing unit and a color discriminating function for demodulating an input composite video signal selected from video signals of at least two different signal systems, comprising the steps of:

detecting a continuity or discontinuity between vertical synchronizing signals of the input video signal, regardless of whether the video signals of the different signal systems have the same of a different field frequency;

executing the color discriminating function when a discontinuity between the vertical synchronizing signals is detected in the continuity detection step;

discriminating a synchronizing signal of the input video signal;

detecting an amplitude of a color burst signal based on a result of the synchronizing signal discrimination step;

executing or stopping discrimination of the color burst signal based on a result of the amplitude detection step;

detecting a phase of the color burst signal based on a result of the amplitude detection step;

determining a signal system of the input video signal based on a result of the phase detection step; and setting an oscillation frequency based on a result of the signal system determination step.

6. A signal detecting method according to claim 5, further comprising the steps of:

checking a value of a counter based on a result of the phase detection step; and switching among a plurality of crystal oscillators based on a checked value of the counter.

7. A signal detecting method according to claim 6, further comprising the step of:

executing the color discriminating function after switching among the plurality of crystal oscillators.

* * * * *